(12) United States Patent
Hahn et al.

(10) Patent No.: US 8,978,733 B2
(45) Date of Patent: Mar. 17, 2015

(54) PROCESS FOR PRODUCING CYLINDRICAL COMPONENTS

(71) Applicants: Rocco Hahn, Weißenburg i. Bayern (DE); Christian Herrmann, München (DE); Korbinian Niedermeier, Isen (DE); Richard Weizenbeck, Erding (DE)

(72) Inventors: Rocco Hahn, Weißenburg i. Bayern (DE); Christian Herrmann, München (DE); Korbinian Niedermeier, Isen (DE); Richard Weizenbeck, Erding (DE)

(73) Assignee: MAGNA BDW Technologies GmbH, Markt Schwaben (DE)

( * ) Notice: Subject to any disclaimer, the term of this patent is extended or adjusted under 35 U.S.C. 154(b) by 140 days.

(21) Appl. No.: 13/726,011

(22) Filed: Dec. 22, 2012

(65) Prior Publication Data
US 2013/0160964 A1    Jun. 27, 2013

(30) Foreign Application Priority Data
Dec. 22, 2011 (DE) .......................... 10 2011 056 942

(51) Int. Cl.
B22D 31/00 (2006.01)
F02F 1/00 (2006.01)

(52) U.S. Cl.
CPC ................ *B22D 31/002* (2013.01); *F02F 1/00* (2013.01)

USPC .................... 164/69.1; 164/76.1; 29/527.6

(58) Field of Classification Search
CPC ............................ B22D 31/00; B22D 31/002
USPC ................................ 164/69.1, 76.1; 29/527.6
See application file for complete search history.

(56) References Cited

U.S. PATENT DOCUMENTS

| 5,413,650 A * | 5/1995 | Jarrett et al. ................... 148/690 |
| 7,806,098 B2 * | 10/2010 | Bing et al. ................. 123/193.2 |
| 2003/0084567 A1 * | 5/2003 | Dickmann et al. ........ 29/888.061 |
| 2009/0288740 A1 * | 11/2009 | Westerheide et al. ......... 148/549 |

FOREIGN PATENT DOCUMENTS

| DE | 37 34 369 A1 | 4/1989 |
| DE | 196 34 504 A1 | 12/1997 |
| DE | 198 45 347 C1 | 3/2000 |
| DE | 10 2004 007 774 A1 | 9/2005 |
| JP | 2001-212644 A | 8/2001 |
| JP | 2002-039245 A | 2/2002 |
| JP | 2008-539087 T | 11/2008 |

* cited by examiner

*Primary Examiner* — Kevin P Kerns
(74) *Attorney, Agent, or Firm* — Jordan IP Law, LLC; Todd A. Vaughn

(57) ABSTRACT

A process for producing a rotationally symmetrical cast aluminum component by die casting, which is reworked partially on its inner and/or outer lateral surfaces. At least a part of the lateral surfaces is not treated and is used as a non-positively locking bearing surface for installation in an assembly and also for bracing the component.

20 Claims, 2 Drawing Sheets

PROCESS FOR PRODUCING CYLINDRICAL COMPONENTS

CROSS-REFERENCE TO RELATED APPLICATIONS

The present application claims priority under 35 U.S.C. §119 to German Patent Application No. DE 10 2011 056 942.1 (filed on Dec. 22, 2011), which is hereby incorporated by reference in its entirety.

FIELD OF THE INVENTION

A process for producing components, such as, for example, those having a cylindrical shape, by aluminium die casting. In particular, a process for remachining the cylindrical components is described.

In the automotive sector, components made of steel are increasingly being replaced by lighter components, as a result of which it is possible to save fuel during operation of the motor vehicle, for example. In this respect, however, at least the same demands are made on the components made of lighter materials as on those made of steel, for example, with respect to corrosion resistance, machinability and rigidity.

Suitable replacement materials in this respect are in particular aluminium alloys. Aluminium alloys have a high corrosion resistance combined with good mechanical properties such as rigidity and machinability and a reduced weight. In addition, the properties in aluminium alloys can be influenced by the constituents of the aluminium alloy.

For cost-effective production, parts and/or components made of aluminium alloys are preferably cast. In order to ensure good castability of the mostly geometrically highly complex cast parts, the aluminium alloy also has to make it possible to cast thin-walled parts which nevertheless have the required stability.

Here, particular importance is attached to the composition of the alloy. This firstly determines the properties which are required in respect of an end product. In addition, however, it also influences the properties which enable and facilitate the processing to form the end product.

Thus, for example, the silicon content of an aluminium alloy influences the fluidity and therefore the castability of a molten alloy. In order to be able to ensure that an aluminium alloy has good castability, it consequently has to comprise a proportion of silicon. The silicon content, however, also reduces the elongation at break and also the mechanical strength of the cast part. These contrasting properties are, however, important particularly for casting large, high-strength cast parts having thin-walled partial regions.

Numerous examples of advantageous alloys can be found in the prior art but do not form part of the solution according to the invention.

After the casting operation, cast parts have a rough surface with a brittleness and strength which differ from the bulk material. In the prior art, such components are remachined.

SUMMARY OF THE INVENTION

In accordance with embodiments, an advantageous process is provided for machining cylindrical components, in which the different material properties of the untreated cast aluminium and of the machined cast aluminium are advantageously used.

It is advantageous that the process in accordance with embodiments utilizes the advantages of the unmachined surface of the cast aluminium part as a support for absorbing forces upon installation in a relatively complex structure. In this respect, it is advantageous that the unmachined surface has a smaller degree of abrasion than a machined surface and therefore the component has a longer service life.

This is advantageous particularly for assemblies which are exposed to an extremely wide variety of temperatures and possibly high forces in the automotive industry.

A further advantage is the smaller amount of space required by the component in an assembly owing to the small wall thicknesses which can be produced by the process.

BRIEF DESCRIPTION OF THE DRAWINGS

The figures and also the description that follows show representative embodiments of the process according to the invention.

DETAILED DESCRIPTION OF EMBODIMENTS

Figure 1:
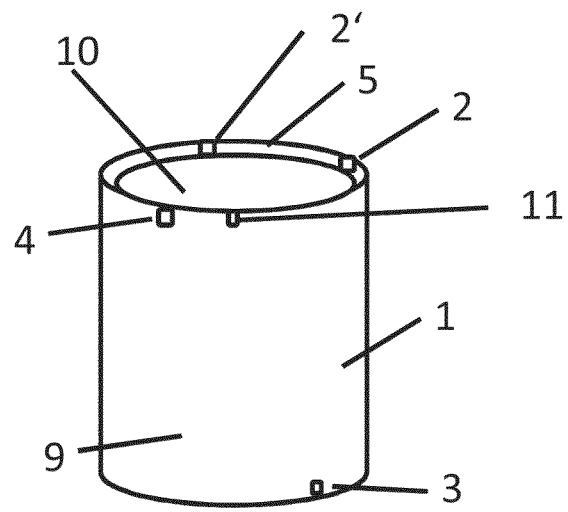
FIG. 1 illustrates a cylindrical component.
Figure 2:
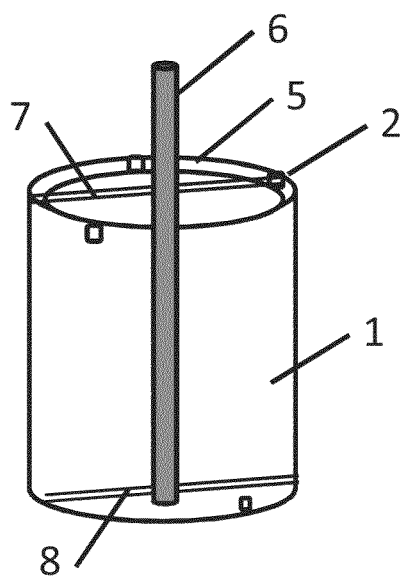
FIG. 2 illustrates a bracing tool.

FIG. 1 illustrates an embodiment of a cylindrical component 1, which is open at both end faces 22, 23. The component 1 has an outer lateral surface 9 and an inner lateral surface 10.

The component 1 is cast as a cast part having at least one lug 3 on the lower periphery thereof and/or at least one lug 11 on the upper periphery thereof. The function of the lugs 3 and 11 is explained hereinbelow. The component 1 has a partial region 5 along the edge of the inner lateral surface 10. This partial region 5 is not intended for the subsequent treatment of the surfaces. Bearing surfaces 2, 2' are present within the partial region 5. A bearing surface 4 is also shown by way of example on the outer surface 9.

Figure 4:
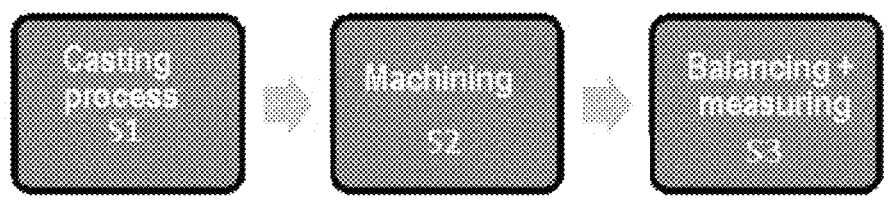
FIG. 4 illustrates a flow chart.

As illustrated in FIG. 4, in the production process of a component, in a first step S1 the component 1 is cast from an aluminium alloy. The casting mould comprises a central core and an outer mould, in which lugs are provided. After casting, a code is applied to the blank casting, the position thereof being clearly defined by the lug 3. In a subsequent process step S2, the blank casting is placed on a workpiece carrier. In this case, the rotational orientation of the cylinder 1 plays a major role. The lug 3 and also the code here serve for positioning and clearly defining the machining position of the cylinder 1. Only in a defined installation position does the lug of the cylinder 1 sit at the correct location in the workpiece carrier and can the code be read by a sensor.

In all other installation positions, although the lug would sit in a fitted manner, the code would be arranged at the incorrect location and therefore would be unreadable.

As an alternative to this, it would be conceivable to cast on a plurality of lugs along the periphery, such that the positioning is ensured clearly.

If the component 1 is turned through 180° in subsequent machining steps, the lug 11 operates in the same way as for the rotationally precise positioning of the component 1.

The component 1 in accordance with the invention is overturned in lathes both on its inner lateral side 10 and on its outer lateral side 9, at least a partial region 5 of the inner lateral side 10 remaining untreated. Raw casting bearing surfaces 2, 2' produced directly in the casting process are present in the partial region 5. The bearing surfaces 2, 2' serve as an abutment for a bracing tool 6, which is inserted into the cylinder and acts on the bearing surfaces with bracing elements 7, 8. The bracing tool 6 is designed in such a way that the component 1 is braced round to achieve the highest precision. At least two raw casting surfaces 2, 2' are present to this end as bearing surfaces. The component 1 which is braced round on the inside can thus be turned on its outer lateral surface 9. The small wall thicknesses of the component 1 reduce the inherent stability of the component 1 and necessitate a more complex bracing concept. The bracing concept in this respect preempts the future installation in an assembly in order to thus use the same bearing points. In addition, the centric installation position and the turning behaviour of the cylinder 1 are already defined optimally in the machining situation.

For machining the inner lateral surface 10, the cylinder 1 is braced round from the outside, bearing surfaces 4 being fitted on the outer casing exactly opposite the bearing surfaces 2, 2' arranged in the inner casing. The outer bearing surfaces are no longer untreated in this case.

The precisely fitting positioning of the cylinder on the set-down surfaces which is ensured by way of the lugs during the process achieves clamping at the correct positions.

A somewhat more particular embodiment utilizes a process for producing a cylinder which, on its inner lateral side, comprises a partial region 5 formed as a toothed ring on each of the two edges. In a larger assembly, these toothed rings serve to receive further toothed wheels, for example the toothed wheels of a transmission.

The toothed rings are produced here exclusively by the casting process and the tooth flanks are not remachined. In this embodiment, the bearing surfaces 2, 2' are formed by the unmachined tooth flanks. The bracing tool used then engages directly into a defined number of teeth.

Figure 3:
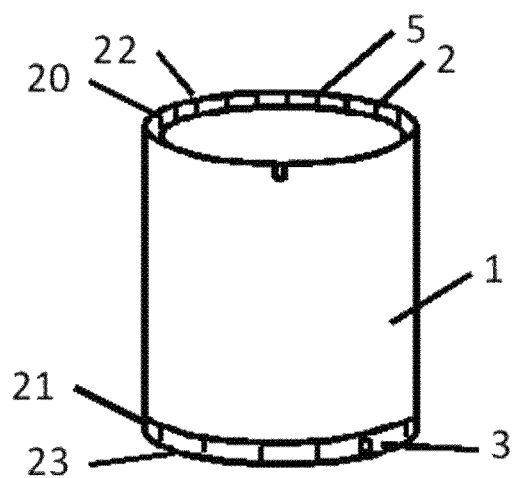
FIG. 3 illustrates a further exemplary embodiment.

As illustrated in FIG. 3, the raw casting points which remain, i.e., a toothing system 20, 21, and therefore, the bearing surfaces 2, 2' of the finished part, are produced by a single element, namely a central core in die casting. In this case, two outer lugs are cast on the outer surfaces of the regions in which the toothing system 20, 21 is formed on the inside.

During the mechanical production, the blank has to be placed on a specially set up workpiece carrier in a rotationally oriented manner with the outer lug 11 on the outer surface of the toothing systems 20. If the blank were to be placed on in a twisted form and therefore were to be placed on outside the lug detent, the code would no longer be readable.

For the over-turning of the outer lateral surface 9 of the cylinder 1, the blank has to be held by the workpiece carrier with the internal handling of the lathe and turned through 180°. At the next setting-down station for the turned component, the component has to be placed directly into a further recess in the setting-down station with the outer lug 3 on the outer surface of the toothing systems 21.

A mounting spindle of the lathe for over-turning the cylinder 1 on the outside picks up the component and, after turning, sets it down again on a setting-down station exactly with the same rotational orientation. When the cylinder is being over-turned on the outside, the blank is braced round at both toothing systems 20, 21 on a tooth tip, the bracing tool bearing against the bearing surfaces 2, 2', which optimally reflects the installed state of the cylinder in the assembly.

The internal handling of the lathe turns the semifinished part back through 180° and sets it down again on a setting-down station exactly with a defined rotational orientation, this setting-down station having pins which engage into the toothing system 20 of the semifinished part.

For internal turning of the cylinder 1, the semifinished part is braced round again on the outside exactly opposite the inner bracing points of the toothing systems 20, 21, and bears against the end face 23 in the axial direction of the cylinder.

A mounting spindle for the internal turning of the cylinder 1 picks up the component from the last setting-down station and, after turning, sets it down again on a setting-down station exactly with the same rotational orientation, this setting-down station, too, having pins with which the finish-turned component is fixed in the toothing system 20.

A gripper (such as, for example, a robotic gripper) of the lathe takes the finish-turned component from the setting-down station and sets it down on the workpiece carrier with exactly the same rotational orientation, the workpiece carrier in turn having pins with which the finish-turned component is fixed in the toothing system 20.

For applications of the cylinder as a rapidly rotating component of an assembly, the turned and thus prepared component also has to be balanced.

To balance the cylinder, the component with the two toothing systems 20, 21 is braced round again on the tooth tip of the bracing tool and bears against the bearing surfaces 2, 2' in the axial direction. This is identical to the bracing points for over-turning the cylinder on the outside, all bearing surfaces being raw casting surfaces during balancing, which optimally reflects the installed state of the pot in the assembly.

A gripper takes the finish-turned component 1 from the workpiece carrier in a rotationally oriented manner and inserts it into the bracing mechanism of the balancing system in a rotationally oriented manner, so that the balancing holes can be set. After the balancing operation has been completed, the spindle turns back into the same position as for mounting the component and the gripper picks up the balanced component and sets it down on the workpiece carrier in a rotationally oriented manner.

A mechanism such as a robot takes the finish-balanced component from the workpiece carrier in a rotationally oriented manner and inserts it into the bracing means of the brush system in a rotationally oriented manner, the bracing means having a special pin with which the finished part is fixed in the toothing system 20. After a brushing operation has been completed, the bracing means turns back into the same position as for mounting the component and the robot picks up the brushed component and sets it down on the workpiece carrier of a washing machine in a rotationally oriented manner.

After the washing operation has been completed, a robot takes the washed component 1, turns it through 180° and sets it on the bracing means of a machine in a rotationally oriented manner, making it possible to measure the component at a precise position, which is defined by the position of the teeth of the toothing systems 20, 21, which have a different number of teeth.

The proposed process is illustrated by way of example and is also performed in steps which are to be considered equivalent for a person skilled in the art.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A process for producing a rotationally symmetrical cast aluminum alloy component by die casting, the process comprising:

casting the component having at least one lug on a peripheral surface thereof from the aluminum alloy;

positioning the component on a workpiece carrier in a specific machining position defined by the at least one lug;

reworking the component, on the workpiece carrier, partially on inner and/or outer lateral surfaces of the component; and bracing the component, after reworking the component, using the unmachined lateral surfaces thereof as a non-positively locking bearing surface.

2. The process of claim 1, wherein the component is braced by round bracing using a bracing tool.

3. The process of claim 2, wherein the round bracing is effected both by bracing on bearing surfaces of the component on the inner lateral side of the component and also by bracing on the outer lateral surface of the component.

4. The process of claim 2, wherein the round bracing permits machining which is optimized for later installation in an assembly.

5. The process of claim 1, wherein the bearing surfaces of the component are formed by tooth flanks of an internal toothing system.

6. The process of claim 5, wherein the tooth flanks which serve as a bearing surface define the positioning of the component on a support surface.

7. The process of claim 6, wherein the component is positioned at least in a machining process by way of an acquisition by measurement.

8. The process of claim 1, wherein the positioning of the component is defined by way of the at least one lug.

9. A process for producing a rotationally symmetrical cast aluminum alloy component by die casting, the process comprising:

casting the component from the aluminum alloy, wherein the component has at least one lug on a peripheral surface thereof;

applying a code to the component which is configured for reading by a sensor;

positioning the component on a workpiece carrier in a specific machining position defined by the at least one lug and the code;

machining the component partially on inner and/or outer lateral surfaces thereof, wherein at least a part of the lateral surfaces are not machined.

10. The process of claim 9, wherein the casting mould comprises a central core and an outer mould, in which the at least one lug is provided.

11. The process of claim 9, wherein the component is braced by round bracing using a bracing tool.

12. The process of claim 11, wherein the round bracing is effected both by bracing on bearing surfaces of the component on the inner lateral side of the component and also by bracing on the outer lateral surface of the component.

13. The process of claim 11, wherein the round bracing permits machining which is optimized for subsequent installation of the component in an assembly.

14. The process of claim 9, wherein the bearing surfaces of the component are formed by tooth flanks of an internal toothing system.

15. The process of claim 14, wherein the tooth flanks which serve as a bearing surface define the positioning of the component on a support surface during machining.

16. The process of claim 15, wherein the component is positioned during the machining by way of an acquisition by measurement.

17. The process of claim 9, wherein the positioning of the component is effected by way of the at least one lug.

18. A process for producing a component, the process comprising:

casting the component having at least one lug on a peripheral surface thereof from an aluminum alloy;

machining the component, on a workpiece carrier, partially on inner and/or outer lateral surfaces thereof;

balancing the machined component;

measuring the balanced component; and bracing the component using unmachined lateral surfaces thereof as a non-positively locking bearing surface.

19. The process of claim 18, further comprising applying a code to the component to be read by a sensor.

20. The process of claim 19, further comprising positioning the component on a workpiece carrier in a specific machining position defined by the at least one lug and the code.

* * * * *